United States Patent
Ben-Arie et al.

(10) Patent No.: US 11,063,695 B2
(45) Date of Patent: Jul. 13, 2021

(54) APPARATUS AND METHOD FOR SELECTING CANDIDATES IN A K-BEST ALGORITHM OF A MULTIPLE INPUT MULTIPLE OUTPUT DECODER

(71) Applicant: Huawei Technologies Co., Ltd., Shenzhen (CN)

(72) Inventors: Yaron Ben-Arie, Hod Hasharon (IL); Chun Hang Lee, Hong Kong (CN); Genadiy Tsodik, Hod Hasharon (IL); Shimon Shilo, Hod Hasharon (IL); Doron Ezri, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/926,094

(22) Filed: Jul. 10, 2020

(65) Prior Publication Data
US 2020/0344000 A1    Oct. 29, 2020

Related U.S. Application Data

(63) Continuation of application No. PCT/EP2018/050646, filed on Jan. 11, 2018.

(51) Int. Cl.
*H04L 1/02* (2006.01)
*H04L 1/00* (2006.01)
*H04B 7/0413* (2017.01)

(52) U.S. Cl.
CPC ......... *H04L 1/0045* (2013.01); *H04B 7/0413* (2013.01)

(58) Field of Classification Search
CPC ....... H04L 1/0618; H04L 1/06; H04L 1/0054; H04L 25/03216; H04L 27/2668; H04B 7/046; H04B 7/026; H04B 7/0632; H04B 7/0413; H03M 13/3927
USPC ................................... 375/267, 260
See application file for complete search history.

(56) References Cited

U.S. PATENT DOCUMENTS

| | | | |
|---|---|---|---|
| 2010/0303176 A1* | 12/2010 | Lilleberg | H04L 25/03203 375/341 |
| 2013/0077721 A1* | 3/2013 | Gupta | H04L 27/38 375/341 |
| 2013/0177114 A1 | 7/2013 | Germanovich et al. | |
| 2015/0155924 A1* | 6/2015 | Qin | H04L 1/0631 375/267 |

(Continued)

FOREIGN PATENT DOCUMENTS

WO    2015058063 A1    4/2015

*Primary Examiner* — Khai Tran
(74) *Attorney, Agent, or Firm* — Leydig, Voit & Mayer, Ltd.

(57) ABSTRACT

The invention relates to an apparatus for selecting candidates in a K-Best algorithm of a MIMO decoder. The K-Best algorithm uses a layered structure comprising a first layer and subsequent layers. In each subsequent layer $2^L$ candidates are selected by iteratively carrying out a selection step, wherein in the selection step the apparatus is configured to calculate and select at least two candidates having minimum distance values of a candidate group, and after each iteratively carried out selection step, the selected at least two candidates are sent to a further subsequent layer for iteratively generating a further candidate group of $2^L$ candidates in the further subsequent layer.

12 Claims, 4 Drawing Sheets

(56) References Cited

U.S. PATENT DOCUMENTS

2017/0141788 A1* 5/2017 Khsiba .............. H04L 25/03242

* cited by examiner

Fig.3

APPARATUS AND METHOD FOR SELECTING CANDIDATES IN A K-BEST ALGORITHM OF A MULTIPLE INPUT MULTIPLE OUTPUT DECODER

CROSS-REFERENCE TO RELATED APPLICATIONS

This application is a continuation of International Application No. PCT/EP2018/050646, filed on Jan. 11, 2018, the disclosure of which is hereby incorporated by reference in its entirety.

TECHNICAL FIELD

The present disclosure generally relates to the field of telecommunications network technology. Particularly, the present disclosure relates to an apparatus and a method for selecting candidates in a K-Best algorithm of a multiple input multiple output decoder.

BACKGROUND

Recent versions of wireless standards adopt multiple input multiple output (MIMO) techniques with a very high number of transmitted streams or signals. The complexity of the optimal MIMO decoder is growing exponentially with higher modulation and higher number of transmitted streams. Therefore, near-optimal solutions are used to achieve a reasonable performance with a reduced complexity. Further, a receiver must be developed at algorithmic and architectural levels to achieve near optimal performance with a tolerable computational complexity. The receiver should also fulfill high throughput, low latency and low power consumption requirements for wireless communication systems.

One of the most popular near-optimal solutions is the K-Best algorithm for reducing computational complexity of a MIMO system. In the K-Best algorithm, an optimal exhaustive search is replaced by an iterative search, wherein the number of possible options per stream is reduced to K at each stage of the algorithm, choosing the lowest distance value or cost value 'child' from its 'father'. This technique allows achieving a good performance with a lower complexity than that of the optimal decoder.

However, the K-Best algorithm still requires a very complex tree-like processing as for example shown in a brute-force K-Best tree implementation according to FIG. 4. In FIG. 4, the K-best tree has 16 layers in the case of 8 received streams. The shown modulation is 1024 QAM. In each layer there is a need to calculate 1024 costs, which is based on the formula $K*2^L$. K, based on the value of $2^L$, is the number of PEDs (partial Euclidian Distance). In FIG. 4, K is equal to 32. L is the real part of the constellation bits, which is 5 real bits, 5 image bits for a modulation of 1024QAM. $K*2^L$ is equal to 1024 ($32*2^5$). Therefore 1024 costs need to be calculated and the smallest 32 costs out of the 1024 costs have to be selected at each tree layer. Consequently, this disadvantageously results in a huge calculation or processing effort in the known K-best tree implementations.

However, using the known Schnorr-Euchner method a selective calculation is done to reduce the amount of cost candidates generation from 1024 to 63 (=2K−1).

SUMMARY

Having recognized the above-mentioned disadvantages and problems, the present disclosure aims to improve the state of the art. In particular, an object of the present disclosure is to provide an apparatus and a method for improving the selection of candidates in a K-Best algorithm of a multiple input multiple output decoder.

The above-mentioned object is achieved by the features of the independent claims. Further embodiments of the disclosure are apparent from the dependent claims, the description and the figures.

According to a first aspect, the disclosure relates to an apparatus for selecting candidates in a K-Best algorithm of a multiple input multiple output, MIMO, decoder, wherein the K-Best algorithm uses a layered structure comprising a first layer and subsequent layers, the apparatus is configured to generate in the first layer a candidate group of $2^L$ candidates, wherein the candidates have distance values according to a received signal of the MIMO decoder, send the generated group of $2^L$ candidates to a subsequent layer, select, in each subsequent layer, $2^L$ candidates by iteratively carrying out a selection step, wherein in the selection step the apparatus is configured to calculate and select at least two candidates having minimum distance values of the candidate group, and send after each iteratively carried out selection step, to a further subsequent layer, the selected at least two candidates for iteratively generating a further candidate group of $2^L$ candidates in the further subsequent layer.

Thereby, this significantly reduces the required logic, area and power consumption of a MIMO decoder. Further, while processing the candidates in each selection step the next candidates are input into the apparatus, such that the throughput is advantageously increased, in particularly doubled, due to the saved time.

In an implementation form of the first aspect, the apparatus being configured to select the at least two candidates comprises the apparatus being configured to select a first candidate having a first minimum distance value of the candidate group.

Thereby, this is advantageous since the throughput of selecting candidates having a minimum distance value is advantageously increased, in particular doubled.

In a further implementation form of the first aspect, the apparatus being configured to select the at least two candidates comprises the apparatus being configured to select a second candidate based on a comparison of a second minimum distance value of the candidate group with a distance value of a brother of the first candidate.

Thereby, this is advantageous since the throughput of selected candidates having a minimum distance value is advantageously increased.

In a further implementation form of the first aspect, the apparatus being configured to select the second candidate comprises the apparatus being configured to compare the second minimum distance value of the candidate group with the distance value of the brother of the first candidate, and select the smaller distance value from the comparison as the second candidate.

Thereby, the method advantageously reduces the required logic of a MIMO decoder.

In a further implementation form of the first aspect, the selected at least two candidates are repeatedly sent for $2^L/2$ clock cycles.

Thereby, this advantageously increases the decoding throughput of the MIMO decoder.

In a further implementation form of the first aspect, in the selection step the apparatus is configured to, after the at least two candidates having minimum distance values have been selected, replace, in the candidate group, the selected at least two candidates by two distance values of brothers from the selection step as new candidates for the candidate group.

Thereby, this advantageously improves the calculating and selecting speed of the $2^L$ candidates in each layer.

In a further implementation form of the first aspect, in the selection step the apparatus is configured to, after the at least two candidates having minimum distance values have been selected, sort the candidate group of $2^L$ candidates by assigning a logical index of each candidate, wherein the logical index of a given candidate is assigned according to the distance value of the given candidate relative to its neighbour candidates.

Thereby, the selecting speed in the selection step is advantageously increased for the at least two candidates having minimum distance values based on a much simpler selection process according to the given index.

In a further implementation form of the first aspect, the logical index comprises $Log_2K+1$ bits.

Thereby, the logical index advantageously simplifies the selection of the at least two candidates having minimum distance values and the selection of the two further candidates having maximum distance values.

In a further implementation form of the first aspect, the most significant bit of the $Log_2K+1$ bits of the logical index indicates that the new candidate belongs to the next subcarrier.

Thereby, in the selection step the selecting process is advantageously simplified. Further, this advantageously enables a differentiation of the candidates of the next subcarrier, which therefore are not considered in the selecting procedure of the candidates of the current subcarrier.

In a further implementation form of the first aspect, in the selection step the apparatus is configured to select, from the candidate group of $2^L$ candidates, two further candidates having maximum distance values, replace, in the candidate group the selected two further candidates by two candidates from a next subcarrier of the MIMO decoder as new candidates for the candidate group.

Thereby, the simultaneously replacing of two further candidates selecting having maximum distance values candidates with two candidates from a next subcarrier and the selecting and sending of the at least two candidates having minimum distance values in one cycle advantageously support the processing time, in particular increases the processing throughput by the factor two.

In a further implementation form of the first aspect, a candidate is a cost, a subcarrier cost or a partial Euclidian distance (PED).

According to a second aspect, the disclosure relates to a method for selecting candidates in a K-Best algorithm of a multiple input multiple output, MIMO, decoder, wherein the K-Best algorithm uses a layered structure comprising a first layer and subsequent layers, the method comprising the steps of generating in the first layer a candidate group of $2^L$ candidates, wherein the candidates have distance values according to a received signal of the MIMO decoder, sending, by the first layer, the generated group of $2^L$ candidates to a first subsequent layer of the subsequent layers for obtaining a candidate group for the first subsequent layer, selecting, in each subsequent layer, $2^L$ candidates by iteratively carrying out a selection step, wherein in the selection step the apparatus is configured to calculate and select at least two candidates having minimum distance values of the candidate group for the subsequent layer, and sending, after each iteratively carried out selection step, by each subsequent layer and to a further subsequent layer, the selected at least two candidates for iteratively generating a further candidate group of $2^L$ candidates for the further subsequent layer.

Thereby, the method advantageously reduces the required logic, area and power consumption of a MIMO decoder. Further, while processing the candidates in each selection step the next candidates are input into the apparatus, such that the throughput is advantageously increased, in particularly doubled.

In an implementation form of the second aspect, the method step of selecting the at least two candidates comprises the method step of selecting a first candidate having a first minimum distance value of the candidate group.

Thereby, this is advantageous since the throughput of selected candidates having a minimum distance value is advantageously increased.

In a further implementation form of the second aspect, the method step of selecting the at least two candidates comprising selecting a second candidate based on a comparison of a second minimum distance value of the candidate group with a distance value of a brother of the first candidate.

Thereby, this is advantageous since the throughput of selected candidates having a minimum distance value is advantageously increased.

In a further implementation form of the second aspect, the method step of selecting the second candidate comprising comparing the second minimum distance value of the candidate group with the distance value of the brother of the first candidate, and selecting the smaller distance value from the comparison as the second candidate.

Thereby, the method advantageously reduces the required logic of a MIMO decoder.

In a further implementation form of the second aspect, the selected at least two candidates are repeatedly sent for $2^L/2$ clock cycles.

Thereby, this advantageously increases the decoding throughput of the MIMO decoder.

In a further implementation form of the second aspect, in the selection step, the method comprises, after the at least two candidates having minimum distance values have been selected, replacing, in the candidate group, the selected at least two candidates by two distance values of brothers from the selection step as new candidates for the candidate group.

Thereby, this advantageously improves the calculating and selecting speed of the 2L candidates in each layer.

In a further implementation form of the second aspect, in the selection step the method comprises, after the at least two candidates having minimum distance values have been selected, sorting the candidate group of $2^L$ candidates by assigning a logical index of each candidate, wherein the logical index of a given candidate is assigned according to the distance value of the given candidate relative to its neighbour candidates.

Thereby, the selecting speed in the selection step is advantageously increased for the at least two candidates having minimum distance values based on a much simpler selection process according to the given index.

In a further implementation form of the second aspect, the logical index comprises $Log_2K+1$ bits.

Thereby, the logical index advantageously simplifies the selection of the at least two candidates having minimum distance values and the selection of the two further candidates having maximum distance values.

In a further implementation form of the second aspect, the most significant bit of the $Log_2K+1$ bits of the logical index indicates that the new candidate belongs to the next subcarrier.

Thereby, in the selection step the selecting process is advantageously simplified. Further, this advantageously enables a differentiation of the candidates of the next subcarrier, which therefore are not considered in the selecting procedure of the candidates of the current subcarrier.

In a further implementation form of the second aspect, in the selection step, the method comprises selecting, from the candidate group of $2^L$ candidates, two further candidates having maximum distance values, replacing, in the candidate group, the selected two further candidates by two candidates from a next subcarrier of the MIMO decoder as new candidates for the candidate group.

Thereby, the simultaneous replacing of two further candidates having maximum distance values with two candidates from a next subcarrier and the selecting and sending of the at least two candidates having minimum distance values in one cycle advantageously support the processing time, in particular increases the processing throughput by the factor two.

In a further implementation form of the second aspect, a candidate is a cost, a subcarrier cost or a partial Euclidian distance (PED).

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that a preferred embodiment of the disclosure can also be any combination of the dependent claims or above embodiments with the respective independent claim.

These and other aspects of the disclosure will be apparent and elucidated with reference to the embodiments described hereinafter.

BRIEF DESCRIPTION OF THE DRAWINGS

The above aspects and implementation forms of the present disclosure will be explained in the following description of specific embodiments in relation to the enclosed drawings, in which FIG. 3 shows a schematic overview of a table with K equals 8 as an example for a method according to an embodiment of the present disclosure.

DETAILED DESCRIPTION OF EMBODIMENTS OF THE DISCLOSURE

Figure 1:
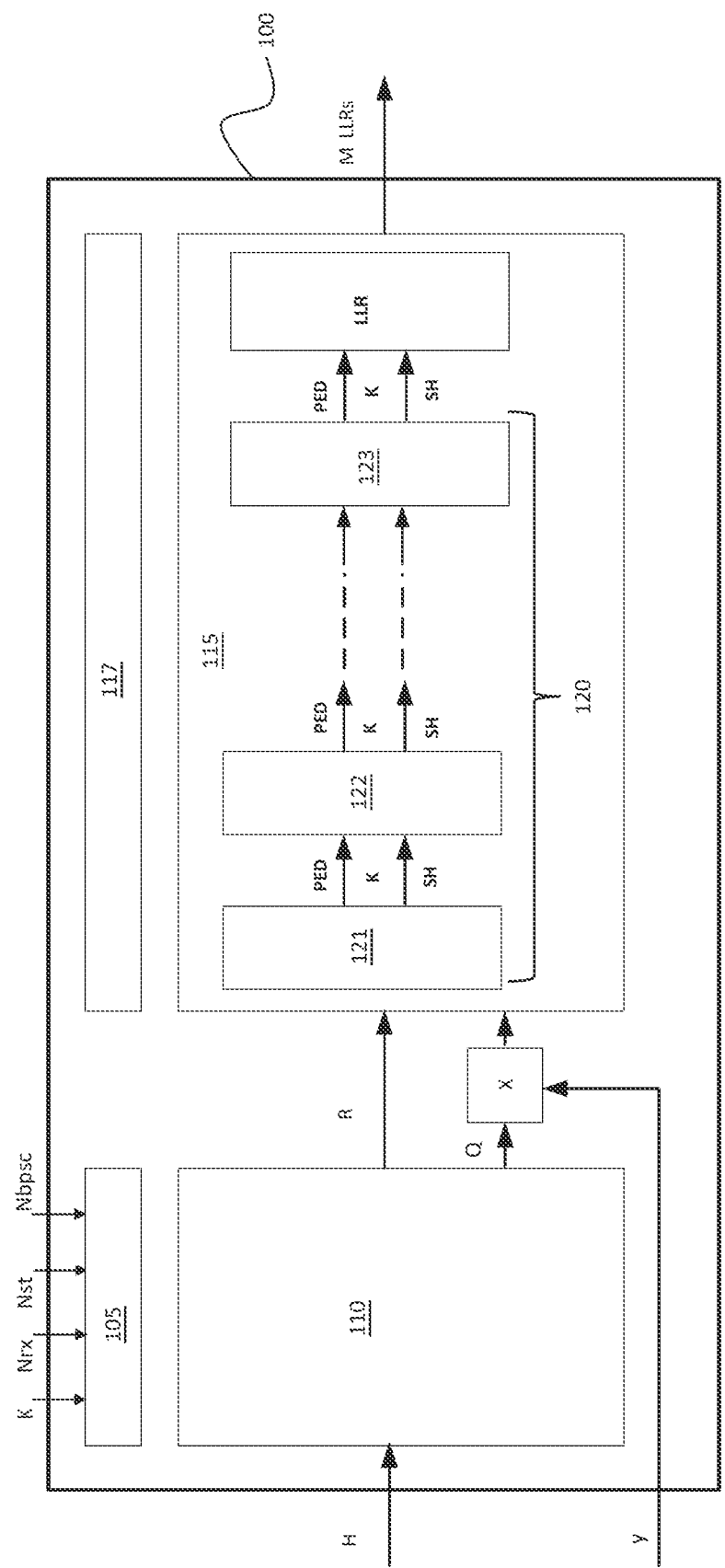
FIG. 1 shows a schematic diagram of a MIMO decoder according to an embodiment of the present disclosure.

FIG. 1 shows a schematic diagram of a MIMO decoder 100 according to an embodiment of the present disclosure. The decoder 100 comprises a re-order control unit 105, a re-order unit 110, a K-Best tree processing unit 215 and a tree control unit 117.

The re-order unit 110 receives complex values of the transmitted signals or streams via the propagation channel, which is modelled by the channel matrix H. The re-order unit 110 re-arranges the matrix H and then decomposes it to Q*R, which means H=Q*R. A re-ordering algorithm is used to select and remove the different streams.

The re-order control unit 105 is responsible for controlling the re-ordering process. The control inputs for the re-order control unit 105 are the values K, $N_{rx}$, $N_{st}$ and $N_{bspc}$. The value K represents the number of candidates to process in the K-best tree, which are passed between the layers 121, 122, 123. The value $N_{rx}$ represents the number of receive (RX) antennas and determines the number of rows of the channel matrix H. The value $N_{st}$ represents the number of transmit (TX) streams and determines the number of columns of channel matrix H. The value $N_{bspc}$ represents the number of bits per subcarrier. For example, for QAM1024, the value $N_{bspc}$ is 10 (=2*L).

The K-Best tree processing unit 215 comprises a layered tree structure 120. The structure 120 comprises multiple layers 121, 122, 123 for processing the K-best algorithm. The values R and Q*y are inputs to the unit 215. The value Y represents the received MIMO signal.

In an M×N Real-Valued MIMO decoder with 1024QAM modulation there are 2*L=10 bits with L imaginary bits and L real bits. There are 2*N layers in the K-best tree and 5-bits (=L) constellation s. The value M is the number of RX antennas, and the value N is the number of TX streams.

The first layer L0 121 generates the first set of K is equal to $2^L$, which in this embodiment with L equals 5 bits results in 8 candidates or costs or PEDs (Partial Euclidean Distance) as a candidate group. Each layer 122, 123 receives K PEDs and constellation histories SH (SH=(n+1)*L bits each), where n is the layer number (e.g. 0 to 15 in FIG. 2) from the previous layer 122, calculates $K*2^L$ candidates of PEDs and constellations s, and chooses the minimal K PEDs and their associated constellation histories (=SH) to send to the next layer. Each chosen constellation s is concatenated to its chosen constellation history.

Figure 2:
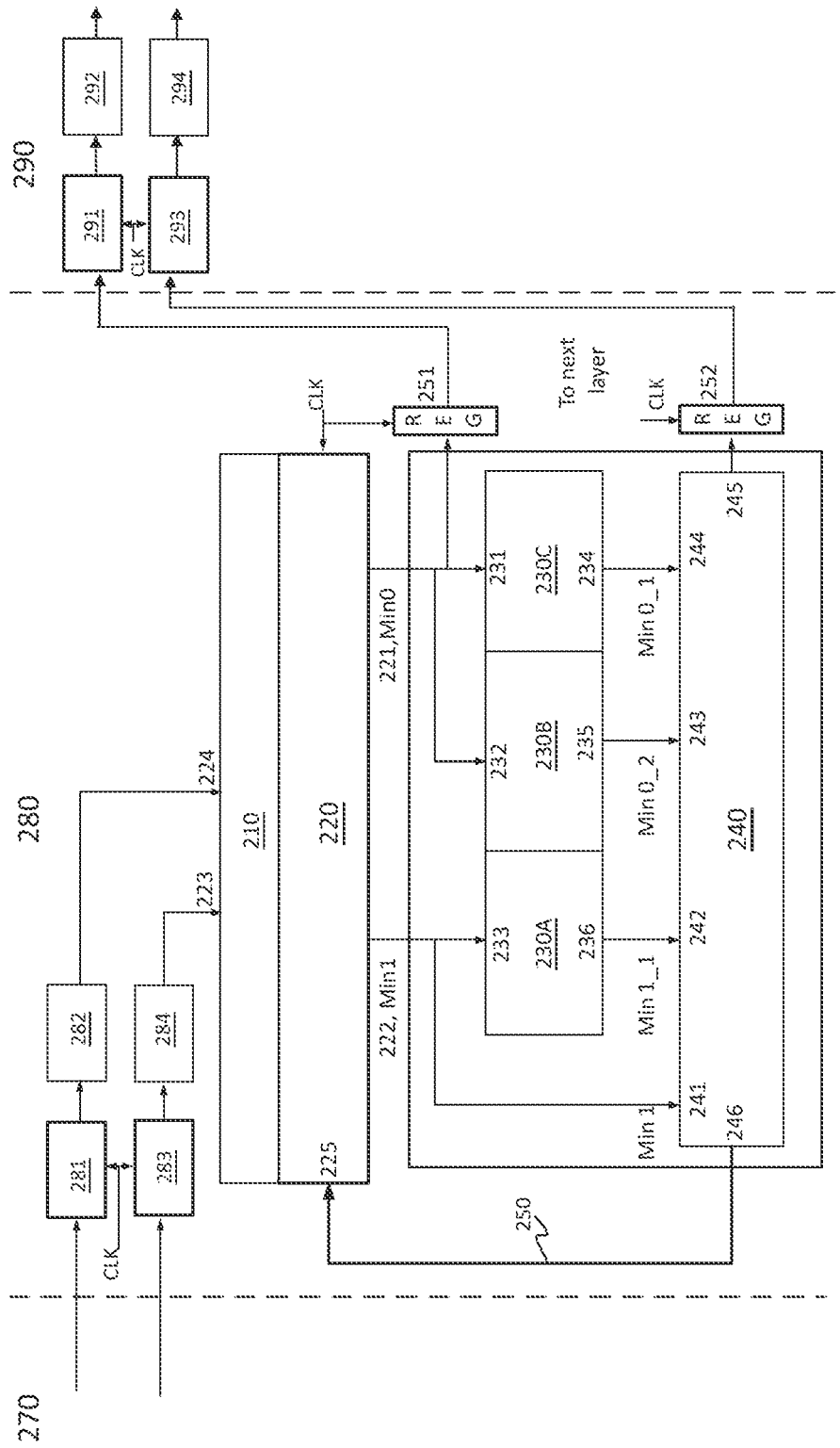
FIG. 2 shows a schematic architecture of a layer of a K-Best tree structure according to an embodiment of the present disclosure.
Figure 4:
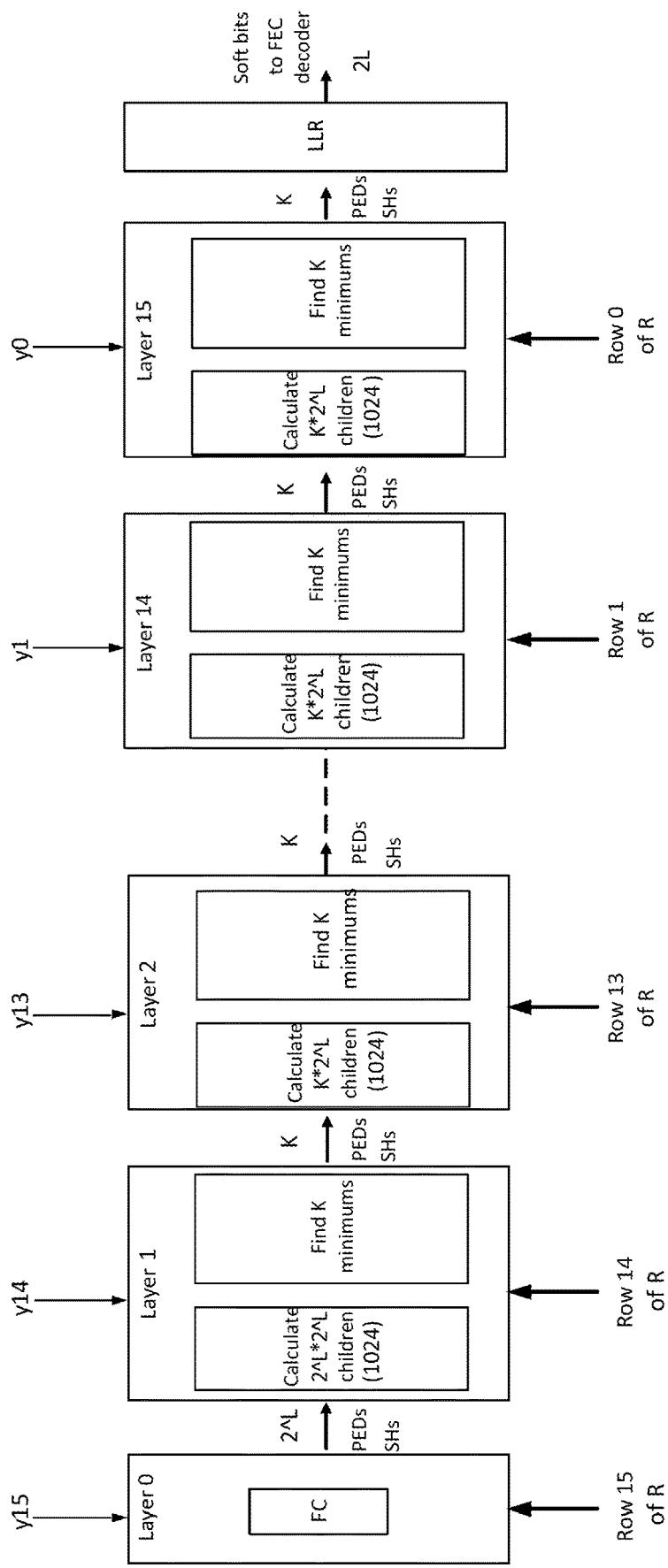
FIG. 4 shows a brute-force K-best tree implementation of the prior art.

As shown in the embodiment in FIG. 2, for an 8×8 MIMO decoder the layered structure 120 of the K-best tree comprises 16 layers based on 8 streams received from layer L0 122 to layer L15 123.

The decoder 100 also comprises an log-likelihood ratio (LLR) unit, which calculates LLRs for the coded bits, which are de-interleaved and passed to a subsequent channel decoder.

FIG. 2 shows a schematic architecture of a layer 280 of a K-Best tree structure.

The layer 280 comprises multiple calculation units 281, 282, 283, 284, which are so called Math A modules or Math B modules. The calculation units 281, 282, 283, 284 are used for calculating necessary values related to the detecting of received signals or symbols, amongst others values, for example, distance values or PEDs or costs.

The layer 280 further comprises a list manager 210, a register 220, three further calculation units 230A, 230B, 230C for calculating brothers based on the selected minimum costs 221, 222, a comparator unit 240 and a system clock CLK for triggering clock cycles.

The list manager 210 comprises a list of indices for sorting the candidates in the register according to their distance values. The list manager 210 is responsible for maintaining a sorted cost list per clock cycle.

The register 220 comprises two inputs 223, 224 for receiving two candidates of the next subcarrier and two outputs 251, 252 for sending selected minimum costs or candidates having minimum distance values to the next layer 290. Further, the register comprises an input 225 for receiving two distance values from the comparator unit 240, in particular from output 246. Furthermore, the register 220 comprises a clock input CLK, which controls the selection steps per clock cycle. The register 220 comprises two outputs 221, 222. The output 221 provides MIN0, which is one of the at least two selected minimum costs or candidates having a minimum distance. The output 222 provides MIN', which is the second of the at least two selected minimum costs.

Each calculation unit 230A, 230B, 230C comprises an input 233, 232, 231 and an output 236, 235, 234. Each calculation unit 230A, 230B, 230C is responsible for calculating brothers of the selected minimum costs. The minimum cost MIN0221 is transferred from the register 220 to the inputs 231, 232 of the units 230C, 230B for calculating brothers MIN0_1 234 and MIN0_2 235. MIN1 222 is transferred from the register 220 to the input 233 of the calculation unit 230A for calculating brother MIN1_1, outputted via output 236.

The layer 280 comprises a comparator unit 240. The comparator unit 240 comprises 4 inputs 241, 242, 243, 244 and two outputs 245, 246. Input 241 receives MIN1 or the second selected minimum cost candidate from the output 222 of the register unit 220. At the input 242 MIN1_1 or the calculated brother of the second minimum cost candidate is received from the calculation unit 230A. At the input 243 the second calculated brother MIN0_2 is received from the calculation unit 230B. At the input 244 the first calculated brother MIN0_1 is received from the calculation unit 230C.

The output 245 provides the smaller value from the comparison of the values of inputs 241, 244, which means the smaller value from the comparison of MIN1 and MIN0_1.

The output 246 provides two distance values from the input 242 and input 243. These two values are transferred or sent from output 246 to the input 225 of the register 220 for further processing as new candidates in the next clock cycle or selection step.

Candidates or costs are received from the previous layer 270 in the calculation units 281, 283. After the calculating process in the units 281, 282, 283, 284 the candidates are sent to the inputs 223, 224 of the register unit 220 and are written into the register 220.

Figure 3:
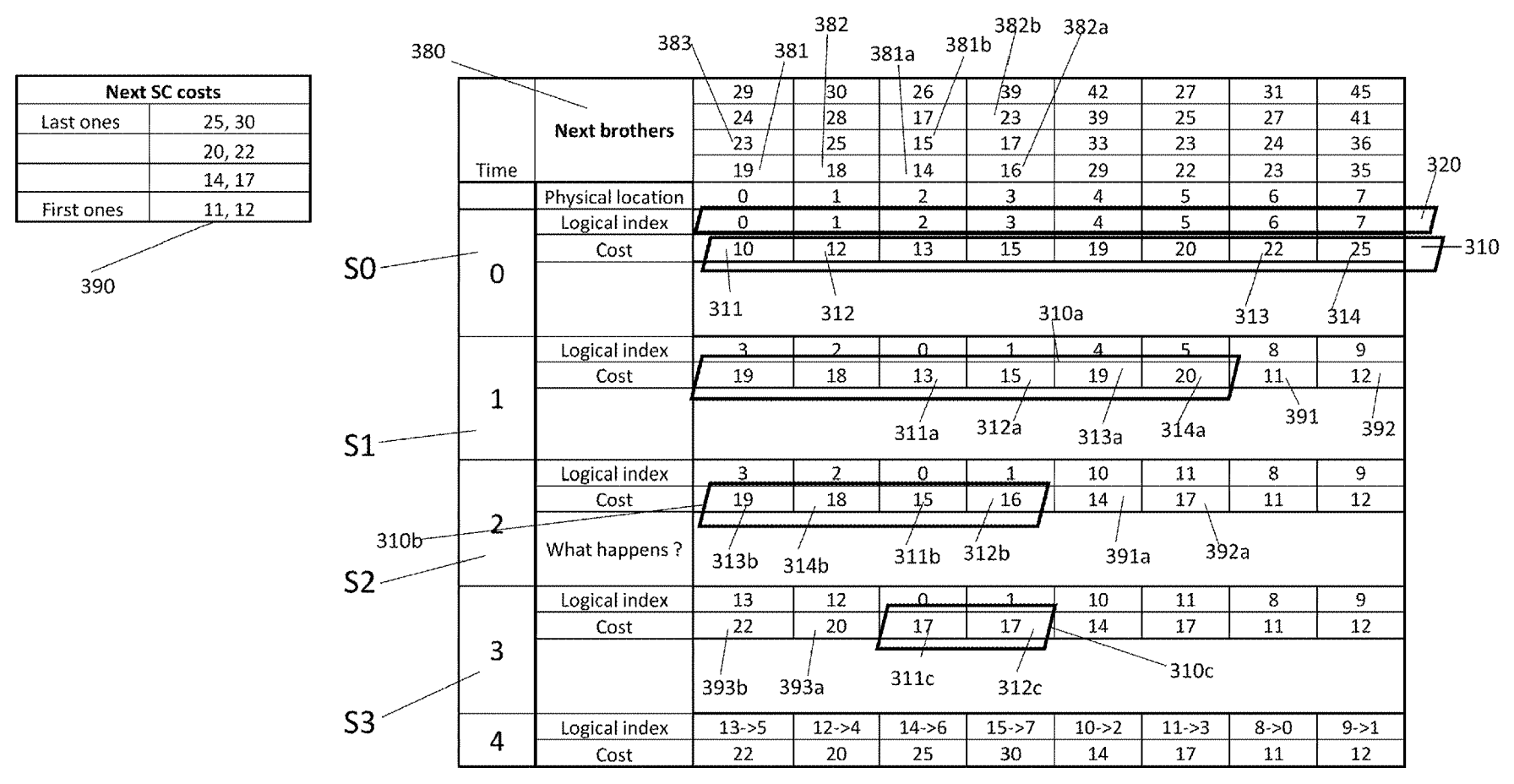

FIG. 3 shows a schematic overview of a table for the method according to an embodiment of the present disclosure.

The table in FIG. 3 depicts the selecting of the $2^L$ candidates, which are iteratively carried out in selection steps S0, S1, S2, S3. The table also shows the details of the calculating and selecting procedure of cost candidates.

The selecting of the $2^L$ candidates is processed based on the clock cycle given by the clock CLK.

At every clock cycle or selection step at least two minimum costs and at least two maximum costs are located based on the logical index of a cost candidate assigned by the list manager 210 from FIG. 2. In this embodiment the list manager 210 uses dedicated five bits indices for maintaining a sorted list of the cost candidates.

At every selection step S0, S1, S2, S3 two minimum costs are sent to the next layer, which in this embodiment results in the selection of in total K is equal to $2^L$, which results in 8 candidates being minimum costs after $2^L/2$ clock cycles, which means 4 clock cycles or selection steps. Alternatively, for another embodiment in which K is equal to 32 ($2^5$) the candidates will be selected in 16 clock cycles (=$2^L/2$).

Selection Step or Clock Cycle S0:

The cost candidates of the candidate group 310 are sorted by assigning a logical index 320 to each cost candidate, wherein the logical index 320 of a cost candidate is assigned according to the cost value of the cost candidate relative to its neighbour cost candidates.

Then the two cost candidates 311, 312 having index 0 and index 1 are selected. The cost candidate with index 0 is the first cost candidate MIN0 having a first minimum distance value 311 or first minimum cost 311. The cost candidate with index 1 is the second cost candidate MIN1 having a second minimum distance value 312.

Both selected cost candidates 311, 312 are transferred to the calculation units 230A, 230B, 230C for calculating the respective brothers 381, 382, 383, which are MIN 0_1, MIN 1_1, MIN 0_2.

The second candidate MIN1 312 is compared with the calculated first brother 381 of the first cost candidate MIN0 311, as already explained in FIG. 2. If MIN 1 312 is smaller than MIN 0_1 381 MIN 1 is selected as the second candidate 252 having a second minimum distance value or second minimum cost 252.

The selected minimum costs 251, 252 are sent to the next layer of the K-best structure for further processing.

The calculated brothers of the selected first and selected second cost candidate are transferred 250 to the register 220 and rewritten at the locations of the selected two cost candidates 311, 312.

Then the two cost candidates 313, 314 having the highest and second highest index value are selected as candidates Max 0 313 and Max 1 314 having maximum distance values. These two cost values 313, 314, are overwritten by the next subcarrier costs 391, 392 via the inputs 223, 224 of the register 220.

Then the logical indices of the cost candidates are updated. Each index comprises L=5 bits, wherein the most significant bit indicates whether the cost candidate belongs to the current subcarrier (indicated by a zero) or to the next subcarrier (indicated by a one). Only the cost candidates with an assigned index comprising a most significant bit of zero are considered in the current sub carrier or current selection step as candidate group 310a in selection step S1, candidate group 310b in selection step S2 and candidate group 310c in selection step S3.

The cost candidates of the next subcarrier 391, 391a, 391b, 392, 392a, 392b can therefore be differentiated from the candidates of candidate group 310a, 310b, 310c and again will not be considered in the current selection step.

Selection Step S1:

The next two cost candidates 311a, 312a having minimum distance values are selected.

Both selected cost candidates 311a, 312a are transferred to the calculation units 230A, 230B, 230C for calculating the respective brothers 381a, 382a, 381b, which are MIN0_1, MIN1_1, MIN0_2.

The second cost candidate 312a is compared with the calculated first brother 381a of the first cost candidate MIN0 311a, as already explained in FIG. 2. If MIN1 312a is smaller than MIN0_1 381a, MIN1 is selected as the second candidate 252 having a second minimum distance value or second minimum cost 252.

The selected minimum costs 251, 252 are sent to the next layer of the K-best structure for further processing.

The calculated brothers 381b, 382a of the selected first and selected second cost candidate 311a, 312a are transferred 250 to the register 220 and rewritten at the locations of the selected two cost candidates 311a, 312a.

Then the two cost candidates 313a, 314a having the highest and second highest index value are selected as candidates Max 0 313a and Max 1 314a having maximum distance values. These two cost values 313a, 314a, are overwritten by the next subcarrier costs 391a, 392a via the inputs 223, 224 of the register 220.

Then the logical indices of the cost candidates are updated as explained in the previous selection step S0.

The selection steps S2 and S3 are executed in the same way as already explained for selection step S0 or S1.

After the last selection step the register 220 is already completely filled with the candidates of the next subcarrier and triggered by the next clock cycle the next selecting of $2^L$ candidates is carried out in the layer 280.

Although the present disclosure has been described with reference to specific features and embodiments thereof, it is evident that various modifications and combinations can be made thereto without departing from the spirit and scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An apparatus for selecting candidates in a K-Best algorithm of a multiple input multiple output (MIMO) decoder,
wherein the K-Best algorithm uses a layered structure comprising a first layer and subsequent layers, and
wherein the apparatus is configured to,
generate in the first layer a candidate group of $2^L$ candidates,
wherein each candidate in the candidate group has a distance value according to a received signal of the MIMO decoder,
send, by the first layer, the generated group of $2^L$ candidates to a first subsequent layer of the subsequent layers for obtaining a candidate group for the first subsequent layer,
select, in each subsequent layer, $2^L$ candidates by iteratively carrying out a selection step,
wherein in the selection step the apparatus is configured to calculate a distance value for each candidate and select at least two candidates having minimum distance values for the subsequent layer, and
send, after each iteratively carried out selection step, by each subsequent layer to a further subsequent layer, the selected at least two candidates for iteratively generating a further candidate group of $2^L$ candidates for the further subsequent layer.

2. The apparatus according to claim 1,
wherein the apparatus being configured to select the at least two candidates comprises the apparatus being configured to:
select a first candidate having a first minimum distance value of the candidate group.

3. The apparatus according to claim 2,
wherein the apparatus being configured to select the at least two candidates comprises the apparatus being configured to:
select a second candidate based on a comparison of a second minimum distance value of the candidate group with a distance value of a brother of the first candidate.

4. The apparatus according to claim 3,
wherein the apparatus being configured to select the second candidate comprises the apparatus being configured to:
compare the second minimum distance value of the candidate group with the distance value of the brother of the first candidate, and select the brother of the first candidate as the second candidate when the distance value of the brother of the first candidate is smaller than the second minimum distance value of the candidate group, or
select the second minimum distance value of the candidate group as the second candidate.

5. The apparatus according to claim 1,
wherein the selected at least two candidates are repeatedly sent to a next subsequent layer for $2^L/2$ clock cycles.

6. The apparatus according to claim 1,
wherein in the selection step the apparatus is configured to, after the at least two candidates having minimum distance values have been selected:
replace, in the candidate group, the selected at least two candidates by two distance values of brothers from the selection step as new candidates for the candidate group.

7. The apparatus according to claim 1,
wherein in the selection step the apparatus is configured to, after the at least two candidates having minimum distance values have been selected:
sort the candidate group of $2^L$ candidates by assigning a logical index to each candidate,
wherein the logical index of a given candidate is assigned according to the distance value of the given candidate relative to neighbour candidates in the candidate group.

8. The apparatus according to claim 7,
wherein the logical index comprises $Log_2 K+1$ bits.

9. The apparatus according to claim 8,
wherein the most significant bit of the $Log_2 K+1$ bits of the logical index indicates that the new candidate belongs to the next subcarrier.

10. The apparatus according to claim 1,
wherein in the selection step the apparatus is configured to,
select, from the candidate group of $2^L$ candidates, two further candidates having maximum distance values,
replace, in the candidate group, the selected two further candidates by two candidates from a next subcarrier of the MIMO decoder as new candidates for the candidate group.

11. The apparatus according to claim 1,
wherein a candidate is a cost, a subcarrier cost or a partial Euclidian distance (PED).

12. A method for selecting candidates in a K-Best algorithm of a multiple input multiple output (MIMO) decoder,
wherein the K-Best algorithm uses a layered structure comprising a first layer and subsequent layers,
the method comprising the steps of:
generating in the first layer a candidate group of $2^L$ candidates,
wherein each candidate in the candidate group has a distance value according to a received signal of the MIMO decoder,
sending, by the first layer, the generated group of $2^L$ candidates to a first subsequent layer of the subsequent layers for obtaining a candidate group for the first subsequent layer,
selecting, in each subsequent layer, $2^L$ candidates by iteratively carrying out a selection step,
wherein in the selection step the apparatus is configured to calculate and a distance value for each candidate and select at least two candidates having minimum distance values for the subsequent layer, and
sending, after each iteratively carried out selection step, by each subsequent layer and to a further subsequent layer, the selected at least two candidates for iteratively generating a further candidate group of $2^L$ candidates for the further subsequent layer.

* * * * *